E. C. SHERMAN.
POT FOR HOT METAL, &c.
APPLICATION FILED APR. 1, 1911.
1,061,784.
Patented May 13, 1913.
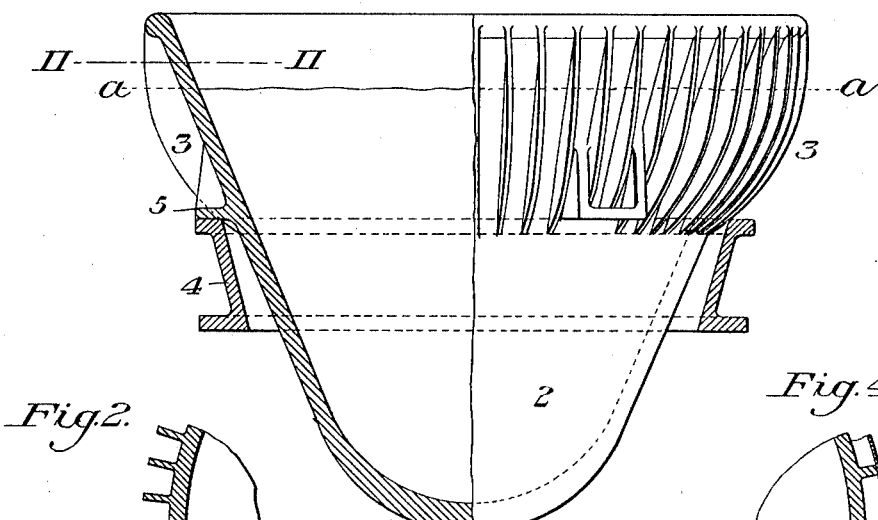
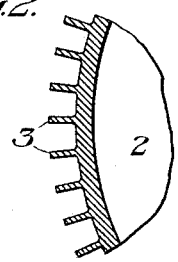
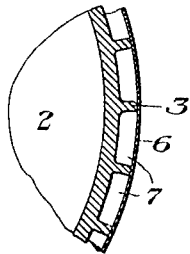
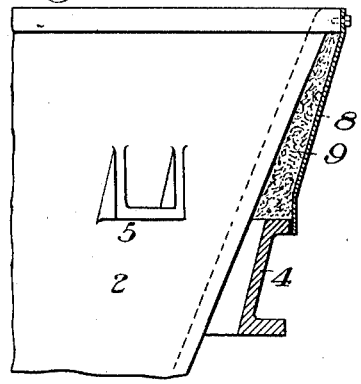
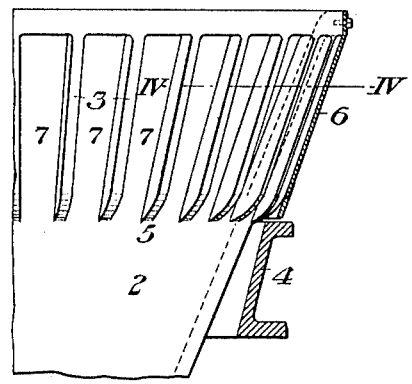
WITNESSES
INVENTOR
E. C. Sherman,
by Bakewell, Byrnes & Parmelee,
his Attys.

UNITED STATES PATENT OFFICE.

ERWIN C. SHERMAN, OF YOUNGSTOWN, OHIO.

POT FOR HOT METAL, &c.

1,061,784.   Specification of Letters Patent.   Patented May 13, 1913.

Application filed April 1, 1911. Serial No. 618,429.

*To all whom it may concern:*

Be it known that I, ERWIN C. SHERMAN, of Youngstown, Mahoning county, Ohio, have invented a new and useful Improvement in Pots for Hot Metal, &c., of which the following is a full, clear, and exact description, reference being had to the accompanying drawings, forming part of this specification, in which—

Figure 1 is a vertical section showing one form of pot embodying my invention; Fig. 2 is a detail sectional view on the line II—II of Fig. 1; Fig. 3 is a fragmentary sectional view showing a modified form of the invention; Fig. 4 is a sectional view on the line IV—IV of Fig. 3; Fig. 5 is a view similar to Fig. 3, but showing another modification.

My invention has relation to pots for holding hot material, and more particularly to pots such as are used for holding and conveying hot cinder or metal from blast furnaces or open hearth furnaces. Pots of this character are usually made of cast iron; and it has been found in practice that after successive heating and cooling, or after continued service at high temperatures, the pot does not go back to its original form on cooling. It has further been found that these pots often fail in service by cracking at or somewhere near the zone where the top surface of the hot material comes in the pot. Cracking at this point appears to be due to the fact that the metal below this line or zone is heated to a high temperature, while that above such line or zone is comparatively cool. This difference in temperature is particularly noticeable at night, at which time the lower portion of the pot will glow while the top portion remains black. After a time the continued heat swells the lower portion of the pot and cracking is the natural consequence. Whether the cause is that stated, it is a fact that the pots fail at this point; and it is the purpose of my invention to increase the life of the pot and postpone or prevent this failure by equalizing the temperatures of the two portions of the pot. There are several ways in which this may be accomplished.

In the form of my invention illustrated in Figs. 1 and 2, the upper portion of the pot 2 is provided on its outer surface with a plurality of projecting ribs 3, which extend considerably below the line of hot material indicated by the line $a$—$a$. These ribs serve to provide an increased heat radiating surface, which affects a more rapid cooling of the heated portion of the pot. The portions of the ribs above the line of hot material will be heated by the hot air rising from the lower and more highly heated portions, as well as by conduction. A considerable equalization of temperature is, therefore, effected and the life of the pot prolonged. These ribs may be of various shapes or form; they may run up and down the pot as shown, or they may encircle the pot or be disposed in any other suitable way. They may extend entirely to the upper edge of the pot, or may terminate lower down, or they may extend entirely from the top to the bottom of the pot.

4 designates the usual trunnion ring of the pot, and 5 the projections or brackets on the pot which rest upon the said ring.

The form of my invention shown in Figs. 3 and 4 is similar to that shown in Figs. 1 and 2, except that in addition to the ribs 3 I have also shown the pot as provided with a sheet metal casing or shield 6 extending over the ribs. This shield may be of any suitable material, either formed as a separate piece and secured to the pot, or it may be cast integral with the ribs. This shield forms a series of air spaces 7, whereby the heat radiated from the lower portion of the pot is held and caused to heat the upper portion, thus causing a further equalization of the temperature.

In Fig. 5 I have shown another form of my invention in which the ribs 3 are omitted, and the upper portion of the pot is surrounded by a heat-retaining shield or casing 8. The space within this shield or casing may be filled, or partly filled, with asbestos, or other heat-retaining material, as indicated at 9.

I do not wish to limit myself to the particular construction which I have herein shown and described, as changes may be made in the details thereof without departing from the spirit and scope of my invention as defined in the appended claim.

What I claim is:—

A pot for hot material, having a plurality of heat radiating projections extending above and below the hot metal line of the pot, and also having a surrounding heat-retaining casing or shield; substantially as described.

In testimony whereof, I have hereunto set my hand.

ERWIN C. SHERMAN.

Witnesses:
H. C. DITMANSEN,
A. M. GALVIN.

Copies of this patent may be obtained for five cents each, by addressing the "Commissioner of Patents, Washington, D. C."